United States Patent Office 3,475,011
Patented Oct. 28, 1969

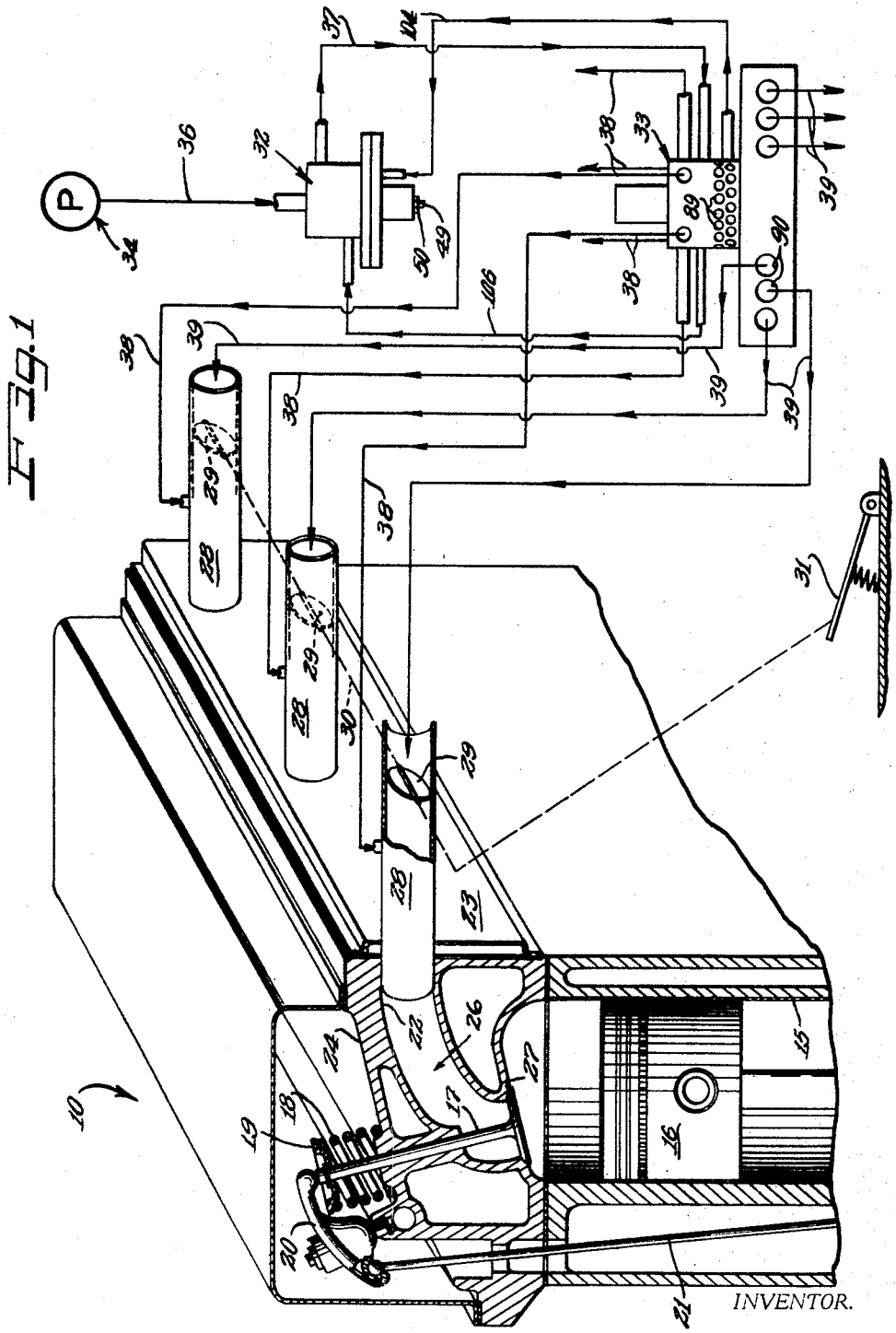

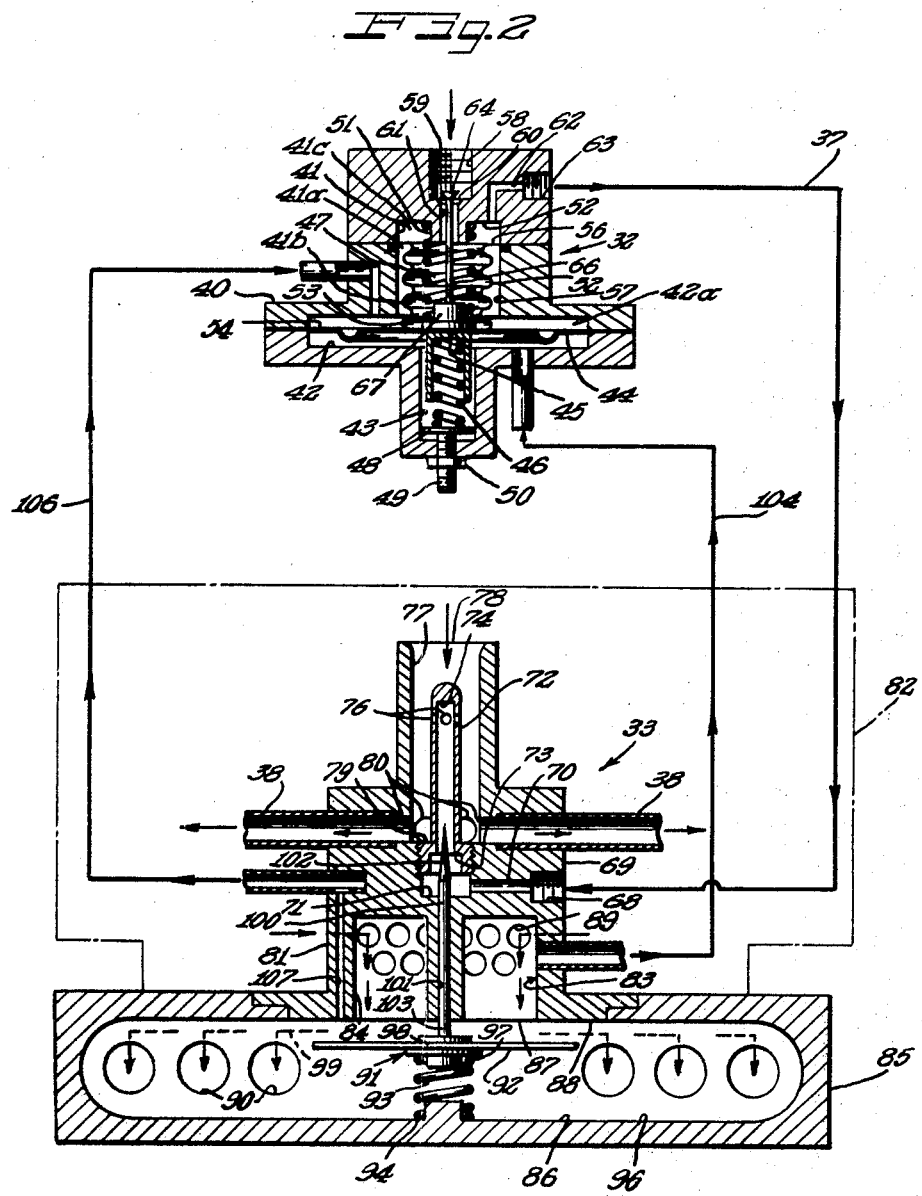

3,475,011
INDIVIDUAL INTAKE PORT CARBURETION SYSTEM
Harvey A. Cook, Cleveland, Ohio, assignor to TRW Inc., Cleveland, Ohio, a corporation of Ohio
Filed Jan. 12, 1967, Ser. No. 608,887
Int. Cl. F02m 41/00, 37/00
U.S. Cl. 261—23　　　　　　　　　　　　　　8 Claims

ABSTRACT OF THE DISCLOSURE

An individual intake port carburetion system for delivering a mixture of air and fuel to the intake ports of a multi-cylinder internal combustion engine. A plurality of supply pipes are connected respectively to the intake ports of the cylinders. Each of the supply pipes is provided with a butterfly valve and all of the butterfly valves are interconnected for simultaneous adjustment. A stream of secondary air and a mixture of primary air and fuel are delivered to the supply pipes in separate conduits which connect to the supply pipes on opposite sides of the butterfly valves. The flow rates of the secondary air streams are controlled by the positioning of the butterfly valves which in turn regulates the speed of the engine. The quantities of fuel in the primary air-fuel mixtures are controlled by an adjustable fuel pressure regulator and a variable fuel metering orifice which vary the fuel flow rates in response to variations in the flow rates of the secondary air. The sizes and shapes of each of the primary air-fuel conduits are selected to provide uniformity in the pressure drops through the various conduits and to ensure uniformity in the charges to each of the cylinders. The pressure drops through the secondary air conduits are also substantially equal to one another.

BACKGROUND OF THE INVENTION

One operating characteristic of internal combustion engines of the type used in automobiles and similar vehicles which has been an object of increasing criticism is the emission of substantial amounts of harmful gases into the atmosphere from engine exhaust. In some parts of the country the problems of air pollution and smog are in great measure due to the operation of a large number of vehicles which, in the aggregate, emit toxic or "dirty" exhaust gases in dangerous quantities.

The causes of "dirty" exhaust gases are varied, but one important cause involves the lack of complete combustion within the cylinders at all speeds and under all driving and operating conditions. This is due, in turn, to certain operating characteristics of internal combustion engines and certain problems attendant thereto but perhaps the most significant problem is lack of rigid control of the ratio of air and fuel in the combustible mixture at all speeds and under all operating conditions.

The lack of close mixture control is an inherent property of most conventional carburetion systems which utilize a single carburetor for charging plural cylinders. Furthermore conventional carburetion systems generally have no provision for variations in the proportions of air and fuel as engine speeds vary. Both of these factors contribute to the general deficiency of conventional carburetion systems to supply a mixture of fuel and air of proper proportions to ensure substantially complete or "clean" combustion over a wide range of engine speeds.

SUMMARY OF THE INVENTION

The present invention is addressed to the problem of "dirty" exhaust gases resulting from incomplete combustion but in addition serves to enhance engine performance and reduce fuel costs. Briefly, the invention comprises apparatus for charging each of the cylinders individually to ensure that each cylinder receives a proper and uniform charge regardless of its relative position in the engine block or in the firing order of the cylinders, and for varying the proportionate amounts of air and fuel in the charge in response to variations in engine speed to provide an optimum fuel-air mixture across a wide range of engine speeds.

The invention comprises an air-fuel distributor and a fuel pressure regulator. The air-fuel distributor directs secondary air from atmosphere to each of the cylinders through an individual conduit which includes an adjustable butterfly valve. All of the butterfly valves are interconnected for simultaneous adjustment by a single device such as a "throttle" or foot pedal.

The air-fuel distributor also directs a mixture of primary air and fuel to each of the individual secondary air conduits downstream of the butterfly valves. The fuel is mixed with the primary air as it issues from a jet tube embodying an adjustable fuel metering orifice, and is supplied to the fuel metering orifice at a pressure regulated by the fuel pressure regulator.

The regulator is connected to a source of pressurized fuel such as a fuel pump. Means are provided to adjust both the fuel metering orifice and the fuel pressure regulator as a function of the flow rate of the secondary air to the cylinders or, in other words, as a function of engine speed. As a result the ratio of air and fuel in the primary air-fuel mixture varies in accordance with engine speed. Further, since the conduits of like kind (primary air-fuel mixture of secondary air) are all sized and shaped to produce substantially uniform pressure drops therethrough, each of the cylinders, regardless of its location in the cylinder, receives the same charge as does each of the other cylinders.

As a result of this more rigid control of air-fuel mixture and quantity of charge, not only is the emitted exhaust gas much "cleaner," but engine performance is enhanced and fuel consumption rates are decreased It is, therefore, an object of the present invention to reduce the amount of harmful gases emitted from the exhaust of vehicular internal combustion engines by providing for more complete combustion of the air-fuel mixture.

Another object of the invention is to control the proportionate amount of air and fuel in the combustible charge over a wide range of engine speed.

Another object is to mix primary air and fuel by issuing jets of pressurized fuel into the primary air stream.

Another object is to provide means for delivering to the various cylinders of the engine a supply of primary air, supply of secondary air, and a supply of fuel, the flow rates of all three of which vary in accordance with variations in engine speed.

Another object is to provide a mixing chamber for the primary air and fuel in which jets of fuel issue into the flow stream of the primary air and in which a plurality of primary air-fuel mixture outlet ports for communication to the various cylinders are arranged in circumferentially spaced relation around the periphery of the mixing chamber in order of the firing order of the various cylinders to provide a rotating primary air flow field within the mixing chamber.

A further object is to control the flow rate of the fuel not only by controlling the size of a fuel metering orifice but also by controlling the pressure of the fuel to the orifice.

Another object is to provide a carburetion system wherein the fuel is induced into the primary air stream at "idle" conditions of the engine but at higher speeds the fuel is sprayed into the primary air stream under pressure.

Another object is to provide substantially uniform charges of primary air-fuel mixture and secondary air to each of the cylinders by providing conduits for delivery thereof having substantially uniform pressure drops thereacross.

BRIEF DESCRIPTION OF THE DRAWING

FIGURE 1 is a substantially schematic showing of a carburetion system constructed in accordance with the principles of this invention as applied to an internal combustion engine.

FIGURE 2 is a vertical sectional view of a fuel pressure regulator and a fuel and air distributor of the invention interconnected by fuel and air flow lines indicated schematically.

DESCRIPTION OF THE PREFERRED EMBODIMENT

FIGURE 1 illustrates generally a carburetion system constructed in accordance with the principles of the present invention as applied to a multi-cylinder internal combustion engine.

More particularly FIGURE 1 shows a engine indicated generally at reference numeral 10 characterized as comprising a plurality of cylinder-piston assemblies, the cylinder of one of which assemblies being indicated at reference numeral 15, and its corresponding piston at 16. Each of the cylinders 15 is provided with an intake valve 17, a valve spring 18, a valve spring retainer 19, a rocker arm 20 and a push rod 21, as will be understood by those skilled in the art.

The intake valve 17 controls the flow of a combustible mixture of air and fuel into the cylinder 15 through a port 22 formed in a side wall 23 of a head 24 of the engine, and through an intake passageway 26 and an intake port 27 also formed in the head 24 and in fluid communication with port 22.

A separate fuel-air supply pipe 28 is mounted on the engine head 24 for each of the ports 22. In the embodiment shown the supply pipes 28 extend out of the side wall 23 of the head 24 substantially at right angles thereto, but it will be understood that the angles at which the supply pipes 28 connect to the side wall 23 as well as the configurations of the supply pipes 28 may vary from the angles and configurations illustrated. Furthermore, the engine 10 may be of the in-line type or of the V-type and may have any number of cylinders since the principles of this invention are applicable to all internal combustion engines regardless of the number and arrangement of the cylinders.

In order to control the flow of the air-fuel mixture a butterfly valve 29 is pivotally mounted within each of the supply pipes 28. All of the butterfly valves 29 are interconnected by means of a suitable mechanical or equivalent linkage indicated schematically at reference numeral 30 and are connected to a throttle device such as a foot pedal indicated at 31 for simultaneous adjustment and control of all of the butterfly valves 29.

The carburetion system further comprises a fuel pressure regulator 32, an air-fuel distributor 33 and a fuel pump 34. The pump 34 draws fuel such as gasoline from a supply reservoir such as a conventional gasoline tank and delivers it under pressure through a conduit indicated at 36 to the fuel pressure regulator 32.

The fuel pressure regulator 32, in turn, delivers pressure-modulated fuel through a line 37 to the fuel-air distributor 33. In the distributor 33 the fuel is admixed with a stream of air denoted "primary air" and distributed through a plurality of fuel-air lines 38 to each of the supply pipes 28. The fuel-air lines 38 connect to the supply pipes 28 downstream of or to the engine side of the butterfly valves 29. A second stream of air denoted "secondary air" is distributed through a plurality of secondary air lines 39 to each of the supply pipes 28 at a point upstream of the butterfly valves 29.

Each of the individual supply pipes 28, therefore, is supplied with a charge of primary air-fuel mixture through one of the lines 38 and is supplied with secondary air through a separate line 39. The primary air-fuel mixtures enter the supply pipes 28 downstream of its respective butterfly valve 29 whereas the secondary air is delivered to the supply pipes 28 upstream of the butterfly valves 29.

Referring to FIGURE 2 the fuel pressure regulator 32 is more particularly characterized as comprising a regulator housing 40 having a large cylindrical chamber 41, a diaphragm chamber 42 and a small cylindrical chamber 43 formed therein. A flexible diaphragm 44 is housed within the chamber 42 to separate the cylindrical chambers 41 and 43.

A central portion 45 of the flexible diaphragm 44 is movable back and forth axially and is constantly biased upwardly by a coil spring 46 housed within the small cylindrical chamber 43 and downwardly by a spring 47 housed in the larger cylindrical chamber 41.

The lower end of the spring 46 bottoms on a flange 48 formed on the inner end of a threaded stud 49 which extends into the chamber 43 and which is threadedly adjustable to vary the tension in the spring 46. The stud 49 can be locked in place by means of a locking nut 50. The top end of spring 46 abuts the central portion 45 of the diaphragm 44.

The top end of spring 47 surrounds a protuberance 51 which extends into the chamber 41 from a top wall 52 against which the spring 47 bottoms. The lower end of the spring 47 bottoms against the central portion 45 of the diaphragm 44.

The large cylindrical chamber 41 and the diaphragm chamber 42 are further partitioned by a fluid-tight bladder or hose 52 which is secured at a bottom end 53 to a top wall 54 of the diaphragm 44, and which is secured at an outturned top end 56 to a side wall 57 of the large cylindrical chamber 41.

Thus the flexible hose 52 separates an outer peripheral portion 41a of the chamber 41 and a top portion 42a of the diaphragm chamber 42 from an inner portion 41b and a top portion 41c of the cylindrical chamber 41.

The pressurized fuel is delivered from the fuel line 36 to the fuel pressure regulator 32 through a fuel intake port 58 which communicates with the interior of the flexible hose 52 through a large bore 59, a fuel intake orifice 60 and a reduced diameter bore 61. The fuel flows from the interior of the hose 52 and the top end 41c of chamber 41 to the fuel-air distributor 33 through a passageway 62, a fuel outlet 63 and the pressure-modulated fuel line 37. The bores 59 and 63 may be threaded as shown to accommodate correspondingly threaded end portions of the fuel lines 36 and 37.

In order to modulate the pressure of the fuel as it flows through the regulator 32 a valve member 64 is provided to regulate the effective flow or open area of the port 60. The valve member 64 is located within the bore 59 and is formed at one end of a thin shaft 66, the other end of which shaft is fixedly secured to the central portion 45 of the flexible diaphragm 44 through a shaft retainer 67. Since the shaft 66 and the valve member 64 move in unison with the diaphragm 44 the effective flow area of the port 60 and thus the pressure modulation of the fuel is controlled by movement of the diaphragm 44.

The pressure-modulated fuel line 37 connects to the fuel-air distributor 33 through a threaded bore 68 opening into a side wall 69 of the distributor. The bore 68 directs the pressure-modulated fuel through a passageway 70 into a small chamber 71 from which it flows upwardly into a hollow tube 72 which is open at a bottom end 73 and closed at a top end 74. A plurality of small circumferentially spaced apertures 76 are formed in the tube 72 near the closed top end 74.

The tube 72 extends upwardly within and coaxially with a cylindrical chamber 77 which may be defined as a primary air or mixing chamber. A top end 78 of the primary air chamber 77 is open whereas a bottom end thereof is closed as is indicated at reference numeral 79. A series of circumferentially spaced ports 80 communicate the lower end of the primary air chamber 77 with the fuel-air lines 38 shown also in FIGURE 1.

The open end 78 of the primary air chamber 77 is in communication with the atmosphere or fresh ambient air. Since it is generally advisable to remove impurities from the air, however, an upper portion 81 of the distributor 33 may be housed within an air filter indicated schematically at 82. Due to space limitations, however, it may in some instances be more feasible to utilize a separate air filter and to deliver the filtered air from the filter to the primary air chamber 77 through a separate conduit.

Another chamber 83 which may be called a secondary air chamber is formed in a lower portion 85 of the distributor 33. The secondary air chamber 83 is more particularly characterized as comprising a cylindrical portion 84 and a manifold portion 86 which communicate with each other through an opening 87 formed in an inner wall 88 of the distributor.

The secondary air chamber 83 is in communication with atmosphere through a series of ports 89, but as noted above in connection with the primary air, it may be advisable to filter the secondary air before it enters the secondary air chamber. From the manifold chamber 86 the secondary air is delivered to the secondary air lines 39 (FIGURE 1) through a series of ports 90 formed in the lower portion 85 of the distributor.

In order to meter the flow rate of secondary air to the supply pipes 28, there is provided an air meter valve indicated generally at reference numeral 91. The valve 91 comprises an air impact plate 92 which is housed within the manifold chamber 86 and which is circularly shaped and axially arranged with respect to the cylindrical chamber 84.

The diameter of the air impact plate 92 is preferably greater than the diameter of the chamber 84 and the plate is secured to a coil spring 93 to accommodate axial movement thereof. A lower end 94 of the coil spring 93 bottoms on a lower wall 96 of the manifold chamber 86 whereas a top end 97 bottoms on a central portion 98 of the impact plate 92.

The spring 93 biases the air impact plate 91 into proximately spaced relation with the wall 88 of the manifold chamber 86 to provide a flow passageway 99 therebetween through which the secondary air must pass as it flows from the cylindrical portion 84 of the secondary air chamber 83 into the manifold chamber 86 and thence out ports 90 and into the secondary air lines 39. Due to the resiliency of the spring 93 and the impact of the secondary air as it abuts the plate 91 the spaced relation between the impact plate 91 and the wall 88 is proportional to the flow rate of the secondary air passing through the flow passageway 99.

For example, when there is little or no secondary air flow the impact plate 91 is situated quite closely to the wall 88, but upon an increase in secondary air flow the impact plate 91 is urged away from the wall 88. Because of the $k$ factor of the spring 93 there is not a straight line relationship between the secondary air flow rate and the spaced relation between the impact plate 91 and the wall 88. As a result the flow rate of the secondary air increases the velocity of the secondary air though the flow passageway 99 increases also.

As noted hereinabove, according to the principles of this invention the proportion of fuel in the primary air-fuel mixture is controlled as a function of the flow rate of secondary air both by means of a fuel metering orifice as well as by modulation of the pressure of the fuel. The port 73 formed in the tube 72 comprises the fuel metering orifice, the open area of which is varied by means of a fuel metering pin 100 slidably carried in a cylindrical bore 101. An upper end 102 of the pin 100 is tapered and a bottom end 103 is fixedly secured to the air impact plate 91 for movement therewith.

As the flow rate of secondary air increases the impact plate 91 is urged downwardly as viewed in FIGURE 2. The pin 100 also moves downwardly to increase the open area of the fuel metering orifice 73. A decrease in the flow rate of secondary air results in an upward movement of the air impact plate 91 with a corresponding reduction in the open area of the fuel metering orifice 73.

In order to modulate fuel pressure as a function of the flow rate of secondary air a static pressure secondary air line indicated at 104 communicates the cylindrical portion 84 of the secondary air chamber 83 with the diaphragm chamber 42 of the fuel pressure regulator 32 below the diaphragm 44. Another static pressure secondary air line 106 communicates the diaphragm chamber 42 above the diaphragm 44 with the flow passageway 99 in the fuel-air distributor 33 through a bore 107 which opens to the flow passageway 99 through the manifold chamber wall 88.

When there is little or no flow of secondary air the static pressure in lines 104 and 106 is substantially equal and thus has no effect on the displacement of the diaphragm 44 of the pressure regulator 32. The diaphragm adjustment screw 49 is adjusted so that the valve member 64 provides a minimum open area of the port 60 and a predetermined minimum fuel pressure in the fuel lines 37. Upon an increase in the flow rate of the secondary air, however, the pressure in the line 104 is greater than the pressure in line 106 and thus the diaphragm 44 and the valve member 64 are displaced upwardly to further open the valve port 60 and to increase the pressure of the fuel in the fuel line 37.

OPERATION

The operation of the present invention differs slightly at idle and at increased engine speeds.

At an idle condition the butterfly valves 29 in the supply pipes 28 (FIGURE 1) are substantially or completely closed to preclude the flow of secondary air. The pressure of the fuel in fuel line 37 is maintained at a level at which the fuel in the tube 72 of the fuel-air distributor 33 rises to a point just below the apertures 76. At idle conditions the distributor 33 operates in the manner of a conventional carburetor whereby the flow of primary air in the primary air chamber 77 flowing past the apertures 76 reduces the static pressure at the apertures to draw fuel from within the tube 72 out through the apertures and into the primary air stream. The rate at which the fuel is aspirated through apertures 76 is controlled by the minimum area of the fuel metering orifice 73, and the pressure drop across the orifice 73 is determined by the difference between the minimum pressure setting of the fuel pressure regulator 32 and the aspirating pressure on the fuel at the aperture 76.

The minimum open area of the fuel metering orifice 73 is selected in relation to the number and sizes of the apertures 76 to provide an optimum fuel-air ratio for idling conditions. The same ratio is maintained at other closed throttle conditions as obtains, for example, during deceleration and engine braking, since the higher-than-idle flow rate of the primary air through the primary air chamber 77 aspirates a correspondingly increased flow rate of fuel through the apertures 76 to maintain the proper air-fuel ratio.

When the butterfly valves 29 of the supply pipes 28 are closed, the complete air-fuel charge supplied to the various cylinders 14 comprises only the primary air-fuel mixture, plus any small amounts of secondary air that may leak through the butterfly valves 29. When the throttle 31 is adjusted to open the butterfly valves 29, however, secondary air flows through the fuel-air distributor 33 to the supply pipes 28 to mix with the primary air-fuel mixture. The speed of the engine increases correspondingly.

As the flow of secondary air increases the air impact plate 91 of the fuel-air distributor 33 is urged downwardly, thereby increasing the open area of the fuel metering orifice 73. At the same time the pressure of the fuel in fuel line 37 is increased due to the upward displacement of the diaphragm 44 and the valve member 64 of the fuel pressure regulator 32. By virtue of the simultaneous adjustment of both the pressure of the fuel as well as of the open area of the fuel metering orifice 73 an optimum fuel-air ratio is maintained regardless of engine speed, whether at idle or decelerating conditions when the throttle butterfly valves 29 are closed, or at increased engine speeds when the butterfly valves are partially or completely open.

Since the connections of the fuel-primary air lines 38 to the primary air chamber 77 of the distributor 33 are spaced circumferentially around chamber 77 in the order of the firing order of this respective cylinders, a rotating air flow field is established within the primary air chamber 77 to ensure proper admixing of the fuel and primary air. Since the lines 38 are all selected to provide mutually uniform pressure drops therethrough the cylinders 15 of the engine 10 are supplied with mutually identical charges of primary air-fuel mixture having mutually identical air-fuel ratios.

The secondary air lines 39 are similarly selected to provide mutually uniform pressure drops therethrough from the fuel-air distributor 33 to the supply pipes 28, thus ensuring that the secondary air charge to each of the cylinders is the same as the secondary air charge to each of the other cylinders.

As a result of the foregoing the present invention maintains an even fuel-air ratio distribution to all of the cylinders of the engine and by rapid response to transient conditions maintains an optimum fuel-air ratio at all engine speeds. This ensures more complete combustion and a reduction in hydrocarbon emissions in the exhaust gases for cleaner operation. The high degree of control of fuel-air ratio and the uniformity of the fuel-air charges to the respective cylinders also improves the fuel economy and performance characteristics of the engine.

I claim as my invention:

1. An individual intake port carburetion system for delivering a mixture of air and fuel to the intake ports of a multi-cylinder internal combustion engine comprising,
   a plurality of fuel-air supply pipes for connection respectively to the individual intake ports,
   a plurality of adjustable flow control valves located within said supply pipes,
   means for adjusting said flow control valves to vary the speed of the engine,
   a fuel and air distributor comprising means forming a primary air chamber and a secondary air chamber both of which are in communication at open ends thereof to atmosphere,
   a plurality of primary air-fuel lines connected respectively at one of the ends thereof to said supply pipes downstream of said flow control valves and at the other of the ends thereof to the primary air chamber in spaced relation to said open end thereof,
   a plurality of secondary air lines connected respectively at one of the ends thereof to said supply pipes upstream on said flow control valves and at the other of the ends thereof to the secondary air chamber in spaced relation to said open end thereof,
   a tube in said primary air chamber including means for issuing jets of fuel from a pressure source into the primary air,
   an adjustable fuel metering orifice means in said tube, and
   air meter valve means comprising means for sensing the flow rate of secondary air in said secondary air chamber and means operatively interconnecting said sensing means and said fuel metering orifice means for adjusting the size of the orifice as a function of the secondary air flow rate.

2. The carburetion system as defined in claim 1 wherein said primary air chamber is cylindrically shaped and said primary air-fuel lines connect thereto in circumferentially spaced relation around the periphery thereof.

3. The carburetion system as defined in claim 2 wherein said fuel jet issuing tube is coaxial with said primary air chamber and includes means to direct jets of fuel radially outwardly in said primary air chamber.

4. The carburetion system as defined in claim 1 and including
   diaphragm operated fuel pressure regulator means for regulating the pressure of fuel being delivered to said tube.

5. The carburetion system as defined in claim 4 wherein said secondary air flow rate sensing means comprises an air impact plate movable in response to variations in the flow rate of secondary air in said secondary air chamber to provide a secondary air passageway having a cross-sectional area which varies in accordance with movement of said impact plate,
   said carburetion system comprising means for operating the diaphragm of said fuel pressure regulator means as a function of variations in the difference in static pressure of secondary air in said secondary air chamber upstream of said impact plate and in said secondary air passageway.

6. An individual intake port carburetion system for delivering a mixture of air and fuel to the intake ports of a multicylinder internal combustion engine comprising,
   means for directing an individual stream of secondary air to each of the intake ports,
   means for varying the flow rates of the secondary air streams to vary the speed of the engine,
   means for directing an individual stream of primary air-fuel mixture into each of the streams of secondary air to admix therewith upstream of the intake ports,
   means for varying the quantities of fuel in the primary air-fuel streams as a function of variations of the flow rates of the secondary air streams,
   said primary air-fuel stream directing means comprising a primary air chamber and a plurality of fuel air-lines communicating with said chamber means and further including means for directing a stream of pressurized fuel into said primary air chamber for admixing with the primary air therein,
   means for varying the flow rate of the fuel stream as as a function of variations in the flow rate of the secondary air streams,
   said fuel stream varying means comprising an adjustble fuel pressure regulator for varying the pressure of fuel in the fuel stream,
   a fuel metering orifice in the path of the fuel stream and means for simultaneously adjusting said fuel pressure regulator and varying the size of said fuel metering orifice in response to variations in the flow rates of the secondary air streams,
   said simultaneous adjusting and varying means comprising a secondary air chamber to which said secondary air strem directing means is connected and through which all of the secondary air must flow, and
   air meter valve means in said secondary air chamber and movable in response to variations in the rate of secondary air flowing through said secondary air chamber,
   said air meter valve means being operatively connected to said fuel metering orifice varying means for varying the size of the orifice in response to movement of said air meter valve means.

7. The carburetion system as defined in claim 6 wherein said simultaneous adjusting and varying means further comprises,
   a diaphragm operated fuel pressure drop valve in said fuel pressure regulator, and
   means for operating the diaphragm of said pressure drop valve as a function of the difference in the static pressure of the secondary air in said secondary air chamber upstream of said air meter valve and passing through said air meter valve.

8. An individual intake port carburetion system for delivering a mixture of air and fuel to the intake ports of a multicyclinder internal combustion engine comprising
- a plurality of fuel-air supply pipes for connection respectively to the individual intake ports,
- a plurality of adjustable flow control valves located within said supply pipes,
- means for adjusting said flow control valves to vary the speed of the engine,
- a fuel and air distributor comprising means forming a primary air chamber and a secondary air chamber both of which comprise means openly communicating each of said respective chambers with atmosphere,
- a plurality of primary air-fuel lines connected respectively at one of the ends thereof to said supply pipes downstream of said flow control valves and at the other of the ends thereof to the primary air chamber,
- a plurality of secondary air lines connected respectively at one of the ends thereof to said supply pipes upstream of said flow control valves and at the other of the ends thereof to the secondary air chamber,
- adjustable fuel supply means for delivering fuel under pressure in varying flow rates into said primary air chamber for admixing therein with said primary air, and
- air meter valve means comprising means for sensing the flow rate of secondary air in said secondary air chamber and means for adjusting said fuel supply means as a function of the secondary air flow rate.

References Cited

UNITED STATES PATENTS

| | | | |
|---|---|---|---|
| 2,997,036 | 8/1961 | Graham | 123—119 |
| 3,016,889 | 1/1962 | Sweeney | 123—119 |
| 3,026,860 | 3/1962 | Ball et al. | 123—119 |
| 3,181,519 | 5/1965 | Dolza. | |

RONALD R. WEAVER, Primary Examiner

U.S. Cl. X.R.

123—119, 139; 261—50, 69